United States Patent [19]

Meisel

[11] 4,450,988
[45] May 29, 1984

[54] BICYCLE BAG SYSTEM

[76] Inventor: Mark Meisel, 948A Banta Pl., Ridgefield, N.J. 07657

[21] Appl. No.: 362,901

[22] Filed: Mar. 29, 1982

[51] Int. Cl.³ .............................................. B62J 9/00
[52] U.S. Cl. .................................... 224/32 A; 224/40
[58] Field of Search .................... 224/32 R, 31, 32 A, 224/30 R, 35, 36, 39, 40; 280/289 A

[56] References Cited

U.S. PATENT DOCUMENTS

| | | | |
|---|---|---|---|
| 299,609 | 6/1884 | Wood | 224/32 R |
| 1,102,159 | 6/1914 | Marrs | 224/32 A |
| 1,963,333 | 6/1934 | Morales | 224/32 A |
| 2,405,744 | 8/1946 | Glass | 224/31 |
| 3,786,972 | 1/1974 | Alley | 224/32 A X |
| 3,937,374 | 2/1976 | Hine, Jr. | 224/32 A |
| 3,938,716 | 2/1976 | Jackson et al. | 224/32 A X |
| 3,989,174 | 11/1976 | Norinsky | 224/32 A X |
| 4,301,952 | 11/1981 | McNeill | 224/32 A |
| 4,345,703 | 8/1982 | Allen | 224/32 A |

OTHER PUBLICATIONS

Eclipse Inc., "The Slide Mount System," 1980.
Kirtland Tour Pak, "The Leader in Touring Technology," 1981, Hine/Snowbridge, Inc.
Jim Blackburn, "Appropriate".

*Primary Examiner*—Steven M. Pollard
*Assistant Examiner*—David Voorhees
*Attorney, Agent, or Firm*—Hubbell, Cohen, Stiefel & Gross

[57] ABSTRACT

Apparatus (10, 12) for supporting a pair of bags (38) on either side of a wheel (14, 16) of a bicycle (18) or the like comprises a pair of support means which may be walls (50), means for securing a bag (38) to each wall, means for removably securing the lower ends of the walls (50) on either side of the wheel (14, 16) in the vicinity of the axle thereof, and means (24) for hingedly securing the upper ends of the walls (50) together. By virtue of the hinge means (24), the spacing between the walls (50) is adjustable for accommodating use with bicycles having different axle lengths, and the walls (50) are collapsible into close confronting relation during off bike use to facilitate carrying of the bags (38) and walls (50) as a unit.

11 Claims, 13 Drawing Figures

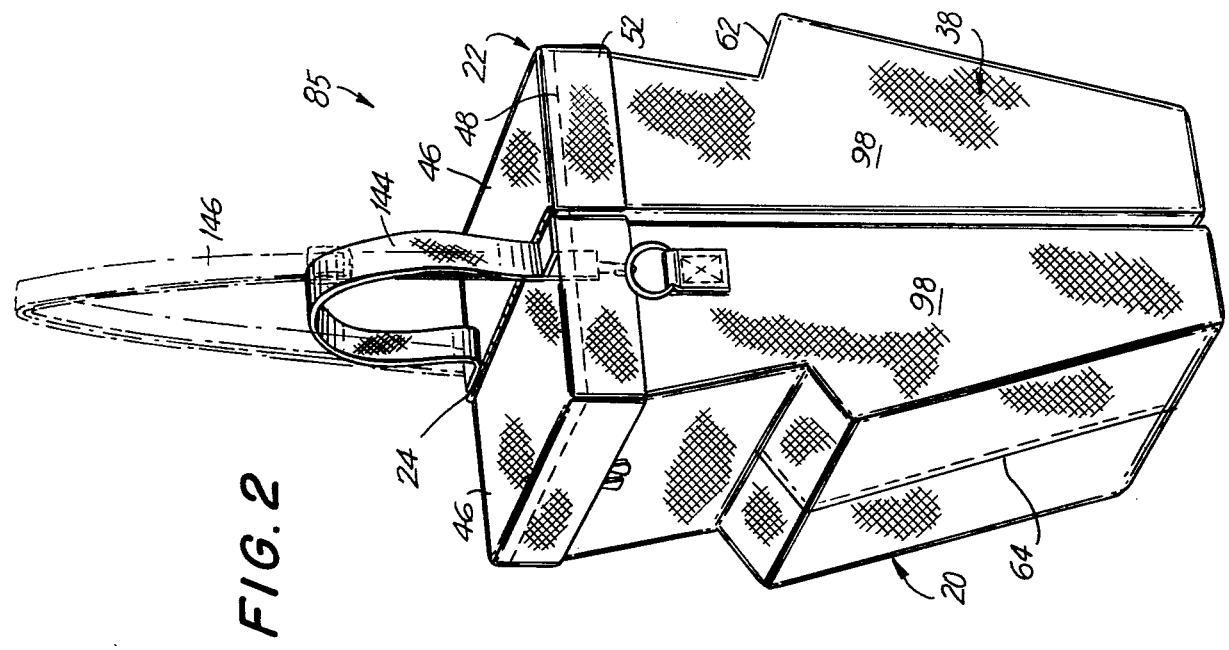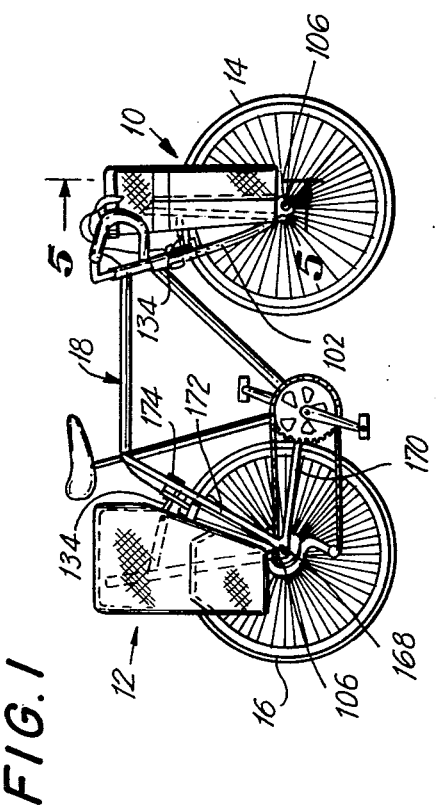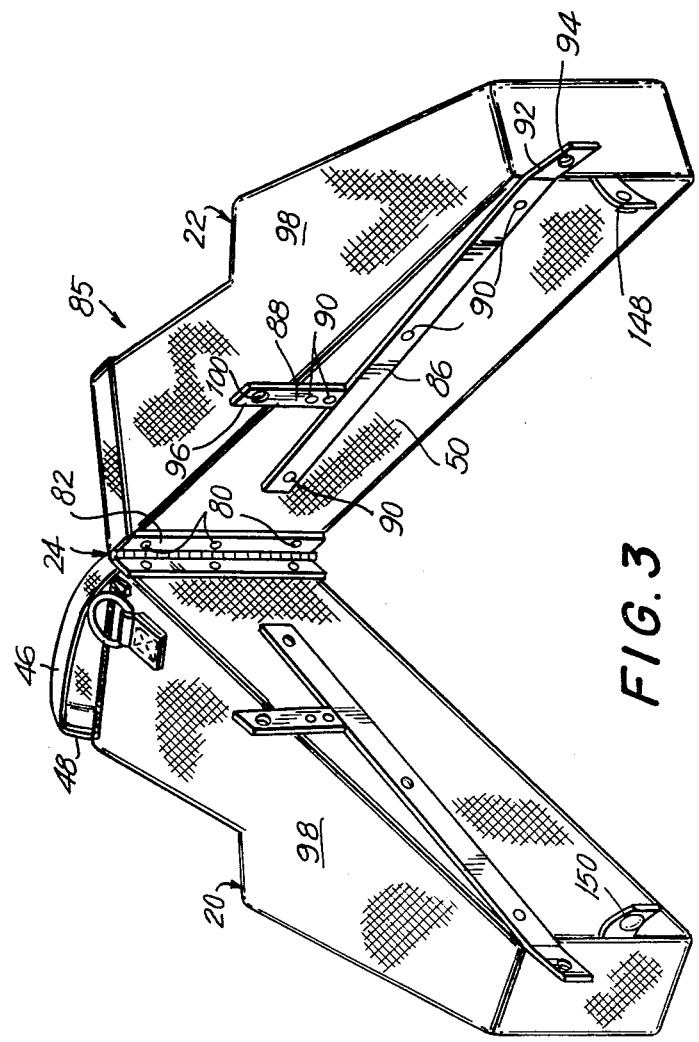

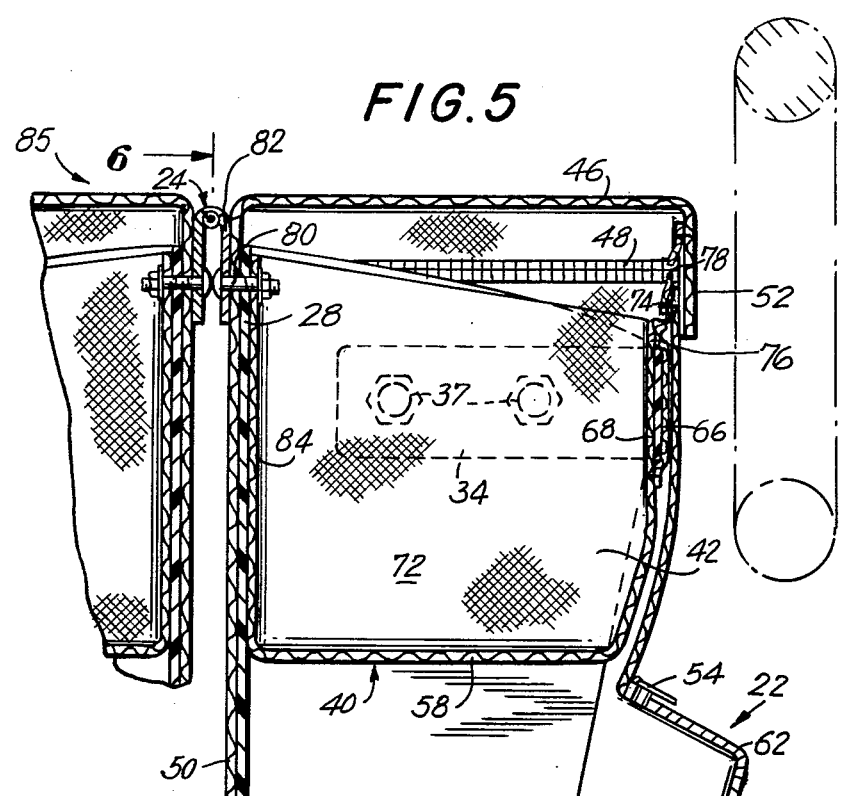
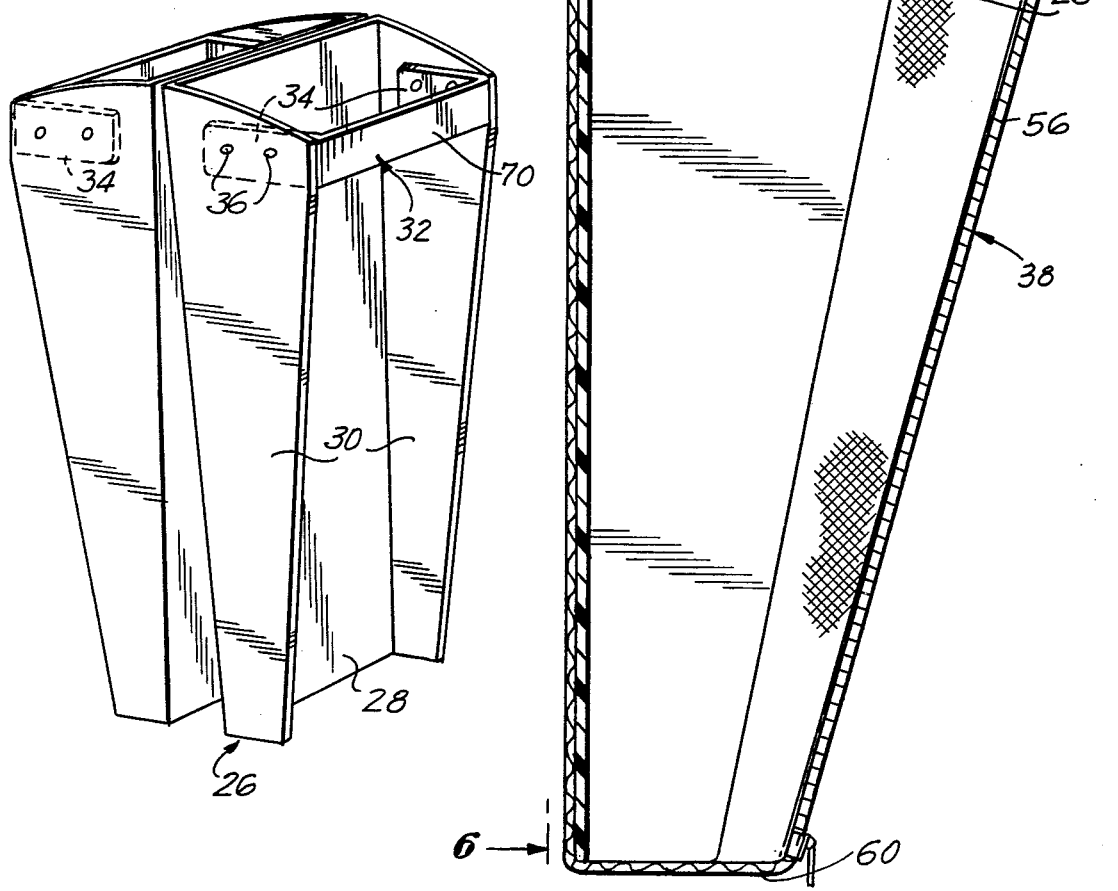

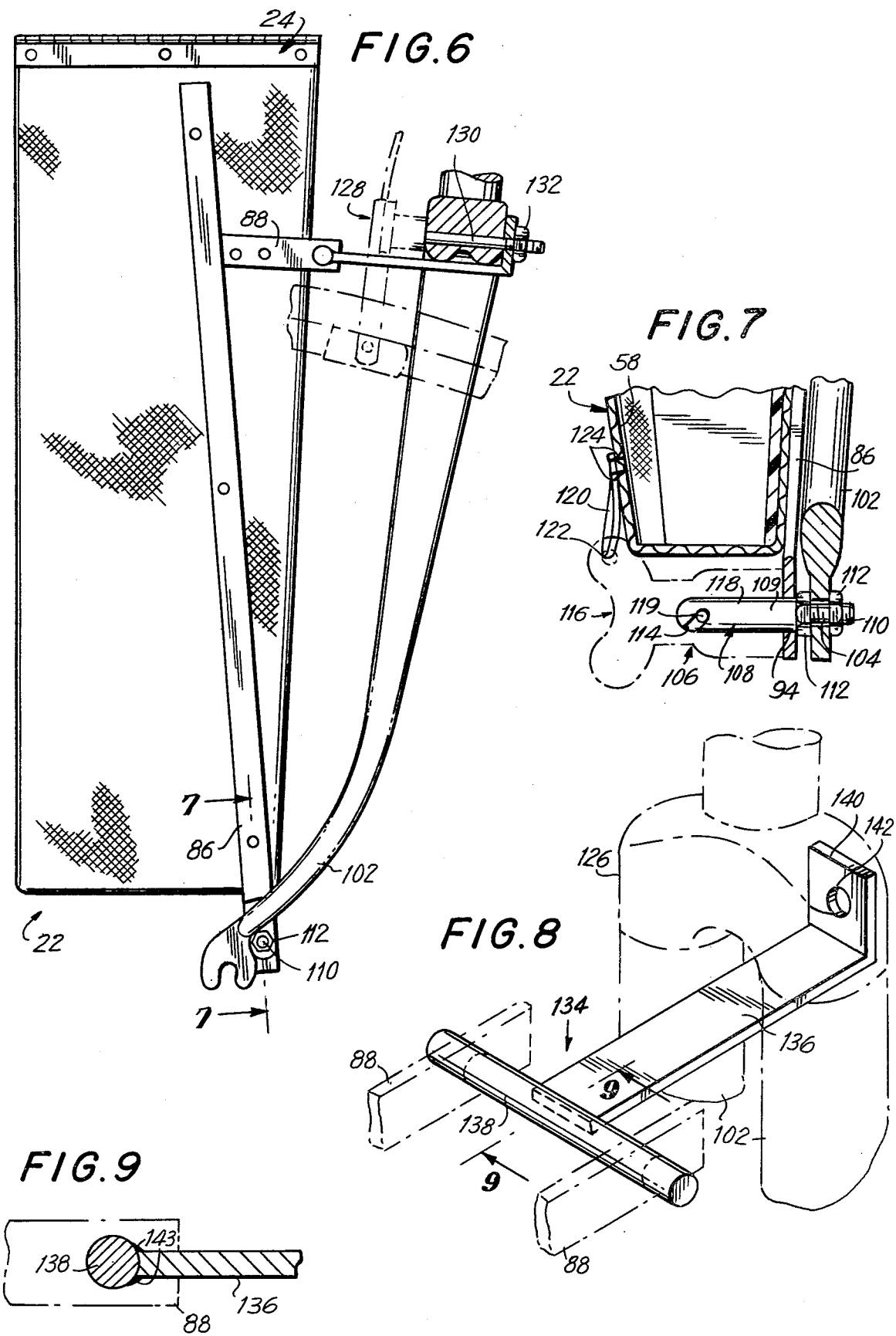

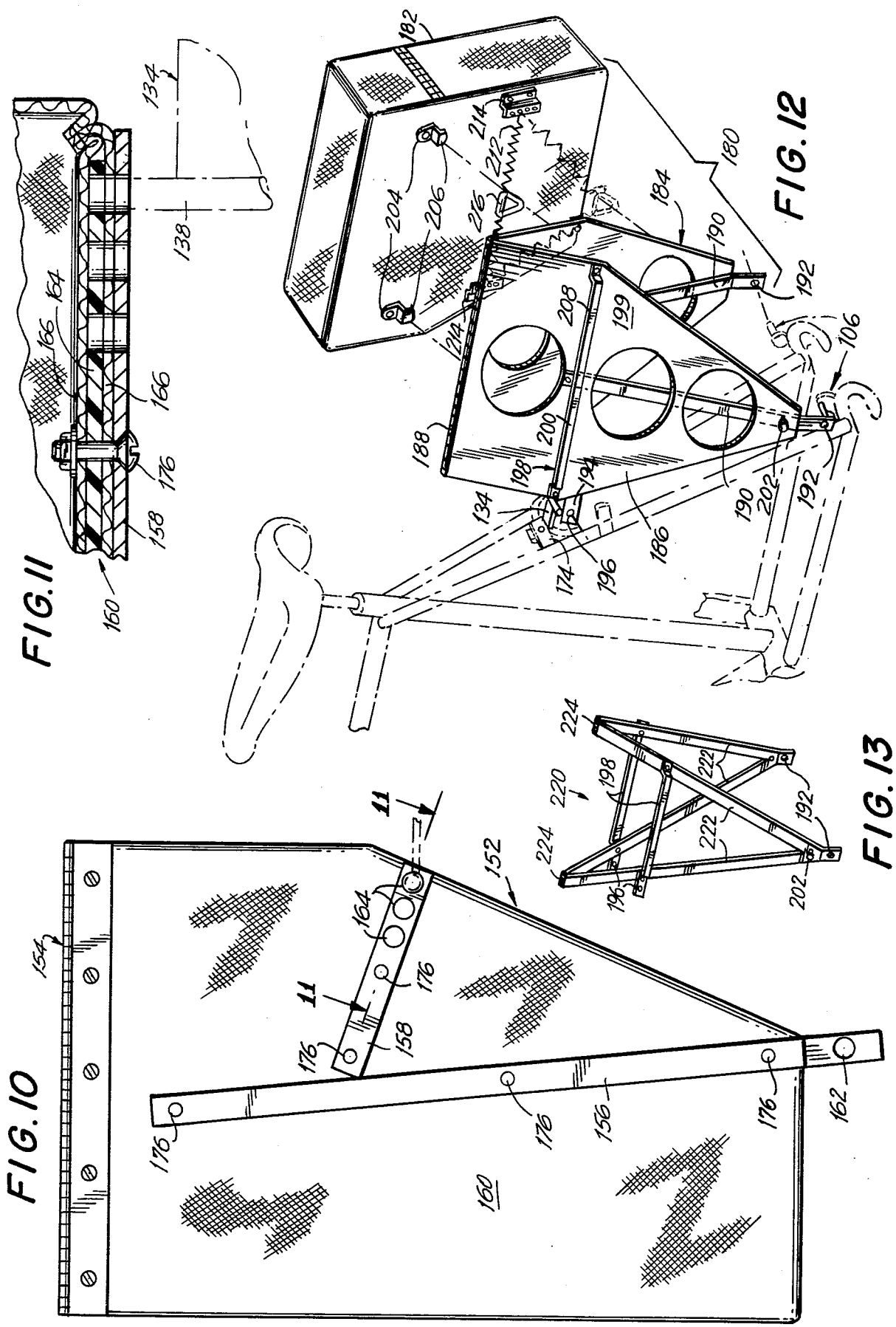

BICYCLE BAG SYSTEM

TECHNICAL FIELD

This invention pertains to carriers removably securable to a bicycle or the like for on or off bike use.

BACKGROUND ART

The prior art discloses numerous carriers adapted for securement about the wheel of a bicycle or the like. In U.S. Pat. Nos. 1,963,333 and 1,102,159, the bag or carrying compartment incorporates structure for securing the apparatus to the bicycle frame about the wheel. In other patents, such as U.S. Pat. Nos. 3,786,972, 3,937,374 and 3,938,716, one or more bags are removably securable to a separate rack which is in turn secured to the bicycle, typically in the vicinity of the rear wheel. Numerous other arrangements of this type are commercially available and disclosed, for example, in brochures distributed by Eclipse, Inc., Ann Arbor, Mich., Jim Blackburn, Campbell, Calif. and Hine/Snowbridge, Inc., Boulder, Colo., U.S. Pat. Nos. 2,405,744 and 3,989,174 each disclose bicycle carriers comprising two bags joined together at their upper ends by a piece of flexible material. When fully extended, the width of the material is the same as the width of the typical bike rack secured about the rear wheel of the bicycle, such that the bags may be carried on the bicycle by laying the piece of material across the rack. When the material is collapsed, it forms a handle for carrying the bags during off bike use, the rack remaining on the bicycle.

To enhance structural integrity and to prevent the bags from striking the wheel, many prior art structures include means for securing the carrier to either side of the wheel in the vicinity of the axle. Such arrangements are disclosed, for example, in U.S. Pat. Nos. 3,786,972 and 3,937,374 discussed above. The carrier in U.S. Pat. Nos. 3,786,972 is additionally secured to the bicycle beneath the bicycle seat in the vicinity of the rear brake assembly. In the prior art, the structure for securing the carrier about the vehicle wheel typically comprises two pairs of struts, one pair for each side of the wheel, each pair being secured at one end to the vehicle wheel in the vicinity of the axle. These struts extend upward on either side of the vehicle wheel and are connected across the top of the wheel by a support member having a width substantially equal to the axle length. As a result of this construction, the strut pairs are spaced apart by a predefined distance substantially equal to the axle length. This renders the carrier cumbersome when removed from the bicycle and also requires some bending of the struts to accommodate use on bicycles having different axle lengths.

DISCLOSURE OF THE INVENTION

In the apparatus of the present invention, the members which support the bags on either side of the vehicle wheel are secured at their lower ends to the bicycle frame in the vicinity of the wheel axle and are hingedly secured together at their upper ends outside the wheel's circumference. Consequently, the spacing between the lower ends may be varied for accommodating use with axles of varying widths and yet collapsed into close confronting relation for defining, with the bags themselves, a compact carrying unit for off bike use.

The preferred apparatus of the present invention comprises a frame assembly having first and second support means hingedly secured together along their upper edges such that the support means are relatively pivotable about the hinge for varying the spacing therebetween, means for securing one bag to each support means, and means for removably securing the frame assembly to the bicycle in the vicinity of an axle thereof such that the hinge is above the wheel and the support means are on either side thereof. In addition to the advantages noted above, the hinged support means provide a highly stable frame assembly.

Further features and advantages of the preferred apparatus in accordance with the present invention will be more fully apparent from the following detailed description and annexed drawings of the presently preferred best modes thereof.

BRIEF DESCRIPTION OF THE DRAWINGS

In the drawings, wherein like reference numerals represent like parts:

FIG. 1 is a side elevational view, partly in phantom, showing two forms of an apparatus in accordance with the present invention in use on a bicycle;

FIG. 2 is a perspective view of the carrying unit of one form of an apparatus in accordance with the present invention;

FIG. 3 is another perspective view of the carrying unit illustrated in FIG. 2;

FIG. 4 is a perspective view of rigid inserts for use with the carrying unit of FIGS. 2 and 3;

FIG. 5 is a sectional view of the carrying unit of FIGS. 2 and 3 taken substantially along the lines 5—5 in FIG. 1;

FIG. 6 is an elevational view, partly in phantom, taken substantially along lines 6—6 in FIG. 5;

FIG. 7 is a fragmentary sectional view taken substantially along the lines 7—7 in FIG. 6;

FIG. 8 is a perspective view, partly in phantom, showing one of the fasteners of the apparatus in accordance with the invention for securing the carrying unit to the bicycle;

FIG. 9 is a fragmentary sectional view, partly in phantom, taken substantially along the lines 9—9 in FIG. 8;

FIG. 10 is a view similar to FIG. 6 showing another form of an apparatus in accordance with the present invention;

FIG. 11 is a fragmentary sectional view, partly in phantom, taken substantially along the lines 11—11 in FIG. 10;

FIG. 12 is a perspective view, partly in phantom, of yet another apparatus in accordance with the present invention; and FIG. 13 is a perspective view showing a modification of the apparatus illustrated in FIG. 12.

BEST MODES FOR CARRYING OUT THE INVENTION

Referring now to the drawings, and initially to FIG. 1 thereof, two forms of a preferred apparatus in accordance with the present invention are generally designated by the reference numerals 10 and 12. The apparatus 10 and 12 are shown as secured, respectively, about the front wheel 14 and rear wheel 16 of the bicycle 18.

Referring to FIGS. 2-9, apparatus 10 includes a pair of carrying structures 20 and 22 pivotably secured along their confronting upper edges, as by a piano hinge 24. Except for certain exceptions noted below, the carrying structures 20 and 22 are mirror images of each other. Therefore, only the carrying structure 22 will be described in detail. Referring to FIGS. 2, 3 and 5, the outer surface of the carrying structure 22 is comprised of a flexible material, such as fabric, in the shape of a bag 38. The bag is preferably lightweight and waterproof, and may be comprised of polyurethane coated nylon pack cloth. As best shown in FIG. 5, a fabric pocket 40 is preferably disposed in the top of the bag 38 for defining upper and lower carrying pouches 42 and 44, respectively. For reasons that will be apparent hereinafter, a fabric slot 66 is provided on the front wall 68 of pocket 40.

Access to the upper pouch 42 is provided by the cover 46, the front and sides of which are releasably secured to the remainder of the bag 38 as by a zipper 48. The back of the cover 46 is preferably integral with the rear fabric wall 50 of the bag 38. Desirably, the cover 46 has a depending rain flap 52 which extends about the front and sides of the cover, the flap 52 also serving to hide the zipper 48 when the cover 46 is closed. Access to the lower pouch 44 is provided by a zipper 54 which extends down the middle of the front wall 56 of the bag 38. More particularly, zipper 54 extends from the vicinity of the bottom wall 58 of the pocket 40 to the bottom wall 60 of the bag 38. As best shown in FIGS. 1, 2 and 5, the front wall 56 is stepped forward at 62 for providing the lower pouch 44 with additional interior volume. A fabric rain flap 64 preferably overlies the zipper 54 (FIG. 2).

As best shown in FIG. 4, carrying structure 22 includes a rigid insert 26 having a back wall 28, a pair of tapered side walls 30, and a separately formed C-shaped brace 32 extending between the upper ends of the walls 30. For reasons that will be apparent as this description progresses, aligned holes 36 are provided in the walls 30 and the legs 34 of the brace 32. As will be more fully explained below, when the crrying structure 22 is assembled, the insert 26 is disposed in the bag 38, thereby giving shape to the bag and enhancing the structural integrity of the apparatus 10.

The preferred assembly of the carrying structure 22 will now be described. After being separately formed, bag 38 and pocket 40 are joined together. To do so, the upper edge 76 of the front wall 68 of pocket 40 is secured, as by stitching 74, to the front wall 56 of the bag 38 and to the lower selvage 78 of the zipper 48. With the cover 46 open, the pocket 40 is flipped outside the bag 38 by pivoting the pocket about its joined edge. At this point, the insert 26, excluding the brace 32, is disposed in the bag such that the back wall 28 of the insert confronts the rear wall 50 of the bag 38. The brace 32 is then fed into the slot 66 such that the crossbar 70 extends across the front wall 68 of the pocket 40 and the legs 34 extend along the side walls 72. The pocket 40 may then be pivoted back inside the top of the bag 38 in the manner shown in FIG. 5, whereupon the legs 34 of the brace 32 may be secured to the side walls 30 of the insert 26 as by the nut and bolt assemblies 37. Preferably, the bolts do not extend through the side walls 72 of the pocket 40.

As best shown in FIGS. 3 and 6, assembly of the carrying structure 22 is completed by securing the orthogonal rigid brackets 86 and 88 to the rear wall 50 of the bag 38. This is preferably accomplished by a plurality of nut and bolt assemblies 90, the bolts of which extend both through the wall 50 and the rear wall 28 of the insert 26. As shown, the lower end 92 of the bracket 86 extends beneath the bottom wall 60 of the bag 38 and is provided with a hole 94. Similarly, the free end 96 of the bracket 88 extends beyond the side wall 98 of the bag 38 and is provided with a hole 100. The brackets 86 and 88 are preferably formed of a lightweight metal, such as aluminum.

The carrying structure 22 is now ready for securement to the hinge 24. As best shown in FIGS. 2 and 5, this is accomplished by a plurality of nut and bolt assemblies 80 which extend through hinge plate 82, rear wall 50 of the bag 38, the back wall 28 of the insert 26, and the rear wall 84 of the pocket 40. When both carrying structures 20 and 22 are secured to the hinge 24, they collectively define a carrying unit 85.

Referring now to FIGS. 1 and 7, securement of the apparatus 10 about the wheel 14 of bicycle 18 will be described. The axle of the wheel 14 extends between a pair of available slots known as drop-outs formed in the lower ends of the two fork blades 102 which define the front fork of the bicycle frame. Typically, the lower end of each fork blade 102 is provided with a hole 104 for the purpose of mounting accessories. In accordance with the invention, quick release fasteners 106 are secured in the holes 104 and serve to releasably secure the apparatus 10 to the fork blades 102.

Referring to FIGS. 6 and 7, only one fastener 106 is shown, it being understood that the construction of the other is the same. As shown, fastener 106 includes a bolt 108 comprising a generally cylindrical member 109 having a reduced diameter threaded stud 110 at one end thereof. The stud 110 extends through the hole 104 in the fork blade 102 and is secured in place by a pair of nuts 112 threaded onto the stud 110 on either side of the fork blade. Fastener 106 also includes a wing cap 116 having a cylindrical bore 118 in one end thereof dimensioned to fit about the member 109. Inside the bore 118 is a spring loaded pin 119 dimensioned for a sliding fit in a spiral groove 114 in the member 109. When the wing cap 116 is disposed on the member 109, rotation of the cap feeds the pin 119 into the groove 114 until it seats in an undercut at the end of the groove, thereby firmly locking the wing cap 116 about the bolt 108. Fasteners 106 of the type described are commercially available. For example, bolt 108 and wing cap 116 are sold by the Dzus Fastener Company, Inc., 425 Union Boulevard, West Islip, N. Y., as their part numbers E9 and 9359W, respectively. To prevent its loss, the wing cap 116 is preferably secured to the carrying structure 22, as by a fabric loop 120 which extends through an aperture 122 in the wing cap and is stitched as at 124 to the front wall 58 of the bag 38.

Referring to FIGS. 6, 8 and 9, apparatus 10 includes an additional fastener 134 for securing apparatus 10 to the bicycle 18 beneath the fork crown 126. Fastener 134 comprises a bar 136 having a perpendicularly oriented rod 138 at one end, and an upstanding leg 140 at the other end. For reasons that will be apparent hereinafter, the leg 140 is provided with a centered hole 142. The rod 138 may be secured to the bar 136 as by welding 143.

As best shown in FIG. 6, the front brake assembly 128 of the bicycle 18 is typically secured to the bicycle frame by a bolt 130 and nut 132, the bolt 130 extending through the fork crown 126. Referring to FIGS. 6 and 8, the bar 136 of fastener 134 is dimensioned to fit between the fork blades 102 beneath the fork crown 126. When so disposed, the hole 142 is in alignment with the bolt 130. The fastener 134 is secured to the bicycle 18 by removing the nut 132, slipping the bolt 130 through the hole 142, and resecuring the nut.

To secure the carrying unit 85 to the bicycle 18, the unit 85 is placed in the position illustrated in FIG. 1 and manipulated until the ends of the bar 138 pass through the holes 100 in the brackets 88. The carrying structures 20 and 22 are then pivoted together about the hinge 24 while slipping the holes 94 in the brackets 86 over the bolts 108. The carrying structures 20 and 22 are then pivoted closer together until the lower ends 92 of the brackets 86 abut their corresponding confronting nuts 112 (FIG. 7). Assembly is completed by securing the wing caps 116 to the bolts 108 for retaining the brackets 86 thereon. By preventing the brackets 86 from pivoting apart, the wing caps also serve to retain the brackets 88 on the rod 138.

It will be apparent from the foregoing that the hinge 24 not only accommodates quick securement of the carrying structures 20 and 22 to the bicycle 18, but also accommodates use with bicycles having different axle lengths, as the hinge 24 renders the spacing between the ends 92 of the brackets 86 fully adjustable.

Removal of the carrying unit 85 from the bicycle only requires removal of the wing caps 116. The brackets 86 may then be pivoted apart about the hinge 24 until the bracket holes 94 and 100 are free of the bolts 118 and rod 138, respectively, whereupon the carrying unit 85 may be lifted off the bike. When the unit 85 is removed, only the fastener 134 and part of the fasteners 106 remain on the bike 18.

Once the carrying unit 85 is removed from the bike, the carrying structures 20 and 22 may be pivoted into close confronting relation (FIG. 2). Referring to FIG. 3, a snap may be used to hold the carrying structures 20 and 22 in close confronting relation for off bike use, the male 148 and female 150 snap portions being affixed to fabric strips secured to the carrying structures near the lower confronting edges thereof. To facilitate carrying of the unit 85 during off bike use, a flexible handle 144 may be stitched or otherwise secured to the covers 46 of the carrying structures 20 and 22. Alternatively, or additionally, a removable, adjustable shoulder strap 146 may be secured to opposite side walls 98 of the carrying structures.

Attention is now directed to the apparatus 12 which is substantially identical to the apparatus 10 described above. The apparatus 12 will therefore not be described in detail, except insofar as it differs from the apparatus 10. Referring to FIGS. 1, 10 and 11, apparatus 12 includes two carrying structures 152 pivoted about a hinge 154. The usual brackets 156 and 158 are secured to the rear wall 160 of each carrying structure 152, the brackets including the usual holes 162 and 164 for securing the apparatus 12 to the bicycle 18. As is true of the apparatus 10, nut and bolt assemblies 176 are preferred for securing the brackets 156 and 58 to the wall 160.

It will be apparent from FIG. 10 that while the bracket 156 of the apparatus 12 closely corresponds to the bracket 86 of the apparatus 10, the bracket 158 is somewhat different from the bracket 88. More particularly, and for reasons that will be apparent hereinafter, the bracket 158 does not extend beyond the wall 160. In addition, rather than a single hole, the bracket 158 is provided with a plurality of holes 164. As best shown in FIG. 11, another respect in which the apparatus 12 differs from apparatus 10 is that the rear wall 160 of the carrying structures 152 are preferably formed from a rigid sheet 164 disposed in a pocket formed by two sheets of fabric 166. The rigid sheet 164 may comprise, for example, an aluminum plastic composite such as Alucobond as sold by Consolidated Aluminum Co., St. Louis, Mo. The rigid sheets 164 used in the rear walls 160 serve the same function as the rigid inserts 26 utilized in the apparatus 10. It will be apparent from FIG. 1 that the shape of the carrying structures 152 of the apparatus 12 is different than that of the carrying structures 20, 22 of the apparatus 10, as the apparatus 12 is tailored to fit about the rear wheel 16 of the bicycle 18. The apparatus 12 consequently has a greater carrying capacity than the apparatus 10.

As best shown in FIG. 1, like the apparatus 10, the apparatus 12 is secured to the bicycle 18 by fasteners 106 and 134. The bolts 108 of the fasteners 106 are secured in holes available in the junction 168 of the rear bicycle struts 170 and 172. The fastener 134 is secured to the brake bridge 174. As best shown in FIG. 11, when the apparatus 12 is secured to the bicycle 18, each end of the rod 138 of the fastener 134 passes not only through one of the holes 164 in the bracket 158, but also through the first fabric sheet 166 and the rigid sheet 164 of the back wall 160. The remaining holes 164 are provided to accommodate use on bikes with varying dimensions. The apparatus 12 is securable to and removable from the bicycle 18 in the same manner described above in connection with the apparatus 10. Because the fasteners used for securing apparatus 10 and 12 to bicycle 18 are the same, it will be apparent that apparatus 10 may also be secured about rear wheel 16. However, due to its size, apparatus 12 may not be secured about front wheel 14.

Referring now to FIG. 12, a modified apparatus in accordance with the present invention is generally designated by the reference numeral 180. Apparatus 180 includes a pair of pannier type bags 182 securable to either side of a supporting structure 184, only one of the panniers 182 being shown in FIG. 12 for purposes of clarity. Supporting structure 184 comprises two sheets of rigid material 186 tapered at their lower ends and pivotally secured at their upper edges by a piano hinge 188. A bracket 190 is secured to the inside surface of each sheet 186, as by a plurality of nut and bolt assemblies (not shown). The lower ends of the brackets 190 protrude below the sheets 186 and are provided with holes 192 for securing the supporting structure 184 to the usual fasteners 106. An additional pair of brackets 194, one for each sheet 186, extend beyond the front of the sheets 186 and are provided with holes 196 for securing the supporting structure 184 to the fastener 134. Sheets 186 and brackets 190 and 194 may comprise, for example, a lightweight metal, such as aluminum.

The structure for securing the panniers 182 to the supporting structure 184 is conventional, and will be only briefly described. Thus, a horizontally oriented bar 198 is secured to the outer surface 199 of each sheet 186, each bar 198 having a portion 200 in spaced relation from its corresponding sheet for defining a slot 208. A stud 202 is secured on the outside surface 199 of each sheet 186 at the lower end thereof. Secured to the rear surface of each pannier 182 is a pair of clips 204 having depending flanges 206 dimensioned for seating in the slot 208, and a pair of brackets 214. A pair of coil springs 212 are secured at one end to brackets 214 and at the other end to a ring 216. When the clips 204 are seated in the slot 208, the ring 216 may be pulled downward over the stud 202, whereupon the pannier 182 is firmly secured on the supporting structure 184.

It will be apparent that the supporting structure 184, with or without the panniers 182 secured thereto, is quickly and easily secured to and removed from the bicycle 18 in the same manner described above in connection with the apparatus 10 and 12. In addition, the panniers 182 may be removed individually, or they can be removed as a unit together with the supporting structure 184. In the latter event, the apparatus 180 may be provided with a handle or strap to facilitate carrying, and means may be provided for releasably securing the lower ends of the sheets 186 together. In FIG. 12, the manner of securing fastener 134 to brake bridge 174 is clearly shown, this being accomplished by a nut and bolt assembly which extends through the brake bridge and the hole 142 in the fastener 134. This illustration is equally applicable to the apparatus 12.

FIG. 13 shows a supporting structure 220 which may be employed in lieu of the supporting structure 184 of FIG. 12. Supporting structure 220 includes two pairs of struts 222, each pair defining a V-shape, the upper ends of the strut pairs being pivotally secured together as by piano hinges 224. It will be apparent that the strut pairs 222 replace the rigid sheets 186 in FIG. 12, thereby minimizing the material requirements for the structure 220. In other respects, the supporting structure 220 is the same as the supporting structure 184, and thus includes bars 198 secured to the struts 222 for receiving the clips 204, and studs 202 at the lower ends of the struts for attaching the rings 216. In FIG. 13, the holes 196 for securing the supporting structure to the fastener 134 are provided in the forward ends of the bars 198 which, for this purpose, extend beyond the struts 222. The holes 192 for securing the supporting structure 220 to the fastners 106 are provided in the junction of the struts 222 beneath the studs 202. Use of the supporting structure 220 will be apparent from the foregoing description.

Since the above as well as further changes and modifications are intended to be within the scope of the present invention, the above description should be construed as illustrative and not in the limiting sense, the scope of the invention being defined by the following claims.

I claim:

1. Apparatus for a bicycle or the like for supporting a pair of bags, one on either side of a wheel of said bicycle, said apparatus comprising:
   a frame assembly, said frame assembly including first and second support means for supporting said bags, each support means having an upper edge, and means for hingedly securing said support means together along said upper edges thereof, whereby said support means are relatively pivotable about said hinge means for varying the spacing therebetween;
   means for securing said pair of bags to said frame assembly with one bag extending from each of said support means; and
   means for removably securing said frame assembly to said bicycle in the vicinity of the axle of said wheel with said first and second support means on either side of said wheel and said hinge means disposed outside the circumference thereof, the variable spacing between said support means accommodating use on bikes or the like having different axle lengths, whereby said frame assembly is securable to said bicycle for transporting said bags thereon and removable from said bicycle whereupon said support means are pivotable about said hinge means into close confronting relation for optionally carrying said bags as a unit.

2. The apparatus according to claim 1, wherein said first and second support means comprise first and second walls.

3. The apparatus according to claim 2, wherein said means for securing said bags to said frame assembly comprises said walls comprising the rear walls of said bags.

4. The apparatus according to claim 2, wherein said means for securing said bags to said frame assembly comprises means for removably securing one bag to each wall.

5. The apparatus according to claim 1, wherein each support means comprises a pair of struts joined together at their lower ends and spaced apart at their upper ends for defining a generally V-shaped configuration, and wherein said means for securing said bags to said frame assembly comprises means for removably securing one bag to each pair of struts.

6. The apparatus according to claim 1, wherein said bicycle or the like has a fork crown or brake bridge, and wherein said means for releasably securing said frame assembly to said bicycle or the like further comprises means for removably securing said frame assembly to the frame of said bicycle in the vicinity of said fork crown or brake bridge.

7. The apparatus according to claim 6, wherein said means for removably securing said frame assembly to said bicycle in the vicinity of the axle of said wheel comprises means for removably securing the lower end of each of said first and second support means to one side of said wheel in the vicinity of said axle.

8. The apparatus according to claim 7, wherein said means for removably securing the lower ends of said support means to said bicycle in the vicinity of said axle comprises
   a hole provided in the lower end of each of said first and second support means;
   means secured to said bicycle including a pair of members extending axially from said wheel on either side thereof in the vicinity of said axle for insertion in said holes; and
   means for removably securing said support means to said members when said members are received in said holes.

9. The apparatus according to claim 8, wherein said means for removably securing said frame assembly to said bicycle frame in the vicinity of said fork crown or brake bridge comprises another hole provided in each support means near confronting lateral edges thereof; and
   means secured to said bicycle frame in the vicinity of said fork crown or brake bridge including a second pair of members extending substantially parallel to said axle on either side of said bicycle for receiving said other holes.

10. The apparatus according to claim 1, further comprising means secured to said frame assembly or said bags for releasably securing said support means in close confronting relation during off bike use.

11. The apparatus according to claim 1, further comprising handle means secured to said frame assembly or said bags for facilitating carrying thereof during off bike use.

* * * * *